United States Patent [19]

Bouchet et al.

[11] 3,794,777

[45] Feb. 26, 1974

[54] DISTRIBUTOR FOR A CENTRALLY CONTROLLED TELEPHONE SWITCHING SYSTEM

[75] Inventors: Claude Bouchet, La Varenne-St-Hilaire; Vladimir Francois Jean Tomasovitch, Meudon-la-Forest, both of France

[73] Assignee: International Standard Electric Corporation, New York, N.Y.

[22] Filed: June 29, 1972

[21] Appl. No.: 267,433

[52] U.S. Cl. .......................................... 179/18 GF
[51] Int. Cl. .......................................... H04q 3/50
[58] Field of Search........179/18 FG, 18 FF, 18 AB, 179/18 ES, 18 GF, 18 G

[56] References Cited

UNITED STATES PATENTS

| | | | |
|---|---|---|---|
| 3,517,123 | 6/1970 | Harr et al. | 179/18 ES |
| 3,558,828 | 1/1971 | Marty et al. | 179/18 FG |
| 3,618,024 | 11/1971 | Leger et al. | 179/18 GF X |

*Primary Examiner*—Thomas W. Brown
*Attorney, Agent, or Firm*—C. Cornell Remsen, Jr.; James B. Raden; Delbert P. Warner

[57] ABSTRACT

A distributor is disclosed for a centrally controlled telephone exchange enabling the control of bistables distributed in groups. The distributor receives from the central unit for a group of bistables to be controlled a control data item indicating the bistables to be set in position 1 and 0, and an inhibition data item indicating the bistables whose position must remain unchanged and serving to mask the elements of the control data corresponding to these bistables. The central unit function is thus limited to the elaboration and to the transmission only of the control data elements intended to certain components of an addressed group.

3 Claims, 4 Drawing Figures

3,794,777

DISTRIBUTOR FOR A CENTRALLY CONTROLLED TELEPHONE SWITCHING SYSTEM

BACKGROUND OF THE INVENTION

1. Field of the Invention.

The present invention concerns a distributor for a switching system and, more particularly, a distributor which may be used in a centrally controlled telephone exchange to enable the central unit to control the different common units.

2. Description of the Prior Art

A telephone exchange includes a certain number of common units each including several components (relays for example), enabling the establishment of different connections for the transmission of signals relative to the establishment of calls and to supervision.

In a centrally controlled exchange, the central unit must control each of these components. For this purpose, it is well-known to use a distributor which receives from the central unit the address of a component and a control signal. The distributor is then in charge of selecting the concerned component and supplying it with the control signal. Generally, a component used in a telephone exchange has two distinct states, 0, and 1 for example, and according to the binary transmission mode, the control signal of a component takes a corresponding value 0 or 1. There results a large number of order transfers between the central unit and the distributor. To reduce this traffic, the components are distributed in groups each one designated by an address. For a control operation, the central unit supplies the group address and control data consisting of as many bits (0 or 1) as there are components in the group and arranged in such a way that a determined rank bit is assigned to the same rank component in the group in order to indicate in which state this component must be set.

However, it may happen that during processing, the central unit determines the state in which only certain components of a group must be set and thus supplies for each of them a bit 0 or 1. The other components not concerned by the processing must remain in the states they occupy. For the latter according to well-known techniques, the central unit searches for the previous state of each of them and supplies a bit 0 or 1 corresonding to this state, which makes it possible to leave the component in its previous state. This solution presents the drawback of necessitating numerous operations in the central unit, in particular in systems where a group of components to be controlled is constituted by components belonging to different common units. Indeed, in this case, the control of one or several components of a unit compels a search for the previous state of the components of the other units in order to conserve their states.

SUMMARY OF THE INVENTION

It is an object of the present invention to provide arrangements for avoiding the research referred to above and thus relieving the processor of a burdensome task.

The system, according to the invention, is characterized in that it includes a first recording device provided for receiving signals from a central unit control where the signals specify states that one or several components of a group must take. A second recording device is provided for receiving inhibition data designating the components of the group whose state must remain unchanged. A masking device is provided receiving the control and inhibition data, in which the inhibition data masks the elements of the control data corresponding to components whose state must remain unchanged, whereas the other elements of the control data are not masked and are transmitted towards the components to be controlled. The central unit functions are limited to the elaboration and the transmission of the useful control data only, without taking into consideration the states of the other components of the same group.

BRIEF DESCRIPTION OF THE DRAWINGS

Various other features will be disclosed from the following description which is given by way of non-limited example referring to FIGS. 1 to 4 which represent.

DESCRIPTION OF PREFERRED EMBODIMENTS

Figure 1:
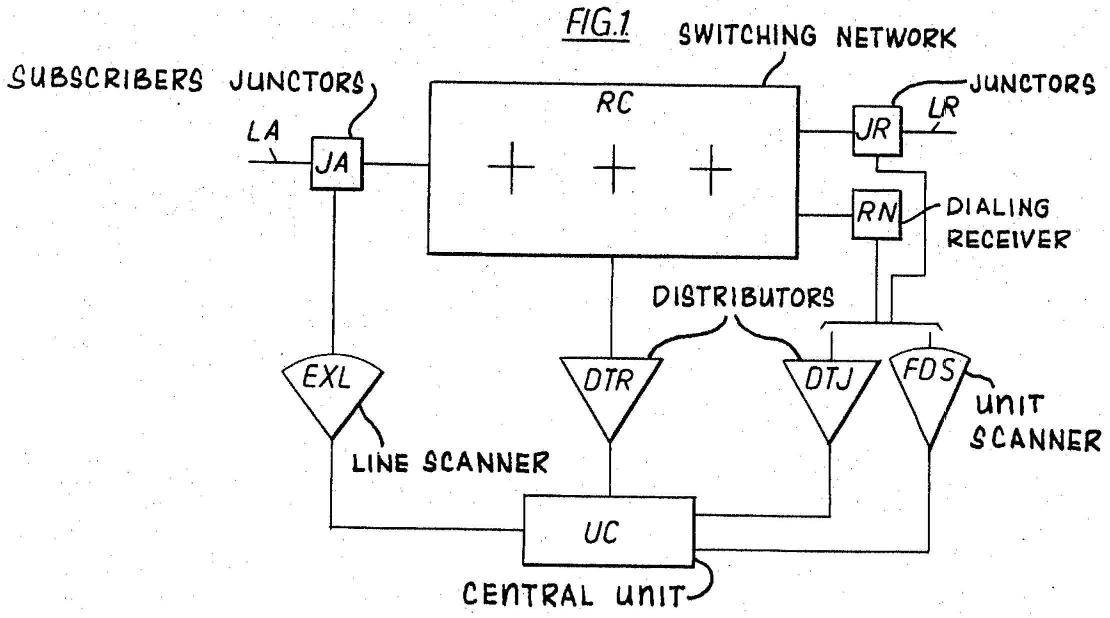
FIG. 1, the block diagram of a centralized control telephone exchange in which may be used the system according to the invention.

FIG. 1 represents the simplified block diagram of a centralized control telephone exchange. The subscribers' lines LA are each terminated by an individual subscriber's line equipment JA, or subscriber's junctor JA. Through its subscriber's junctor JA, each line is connected to an outlet of a switching network RC. As an example, there has been represented a switching network constituted by three crossbar switch stages. Common units of various types are connected to the inlets of the network RC, as required among which have been represented junctors JR and dialling receivers RN. A junctor JR has two accesses, one of which is connected to an inlet of the switching network RC and the other, for example, to a circuit LR leading to another exchange. It is provided for the establishment of an outgoing call; a calling line is then connected to one access, through the switching network RC and, therefore, is connected to circuit LR. Junctor JR supplies on the line and on the circuit the necessary currents and signals. It supervises the call and detects, in particular, the termination of it.

The operation of this exchange is ruled by a central unit UC which is nothing else but a stored program electronic processor. This central unit UC, receives information from the subscriber's junctors JA, through a line scanner EXL, and from the common units such as junctors JR and receivers RN, through a unit scanner FDS. The central unit UC processes the information thus obtained, in a way defined by the stored program, and deduces the actions to be taken with the view of call establishment, that is, mainly, the connections to be established in the switching network RC and the signals that must send the common units on the lines and circuits. The corresponding orders are transmitted to the switching network RC through a distributor DTR and to the common units through a distributor DTJ.

Each common unit includes a certain number of circuits to be controlled by the central unit, for the achievement of various internal connections and mainly for current and signal sending on the lines and circuits, according to telephone operation. Certain of these circuits that will be considered more particularly in the scope of the present invention, require to receive orders precisely located in time. Consequently, they include a control bistable, and the central unit, through distributor DTJ, transmits orders which must be quickly executed in order not to keep waiting other similar orders whose object is to set in one or the other position such control bistables.

Moreover, the common units are numerous and finally distributor DTJ must have great dimensions and a high-speed operation.

Figure 2:
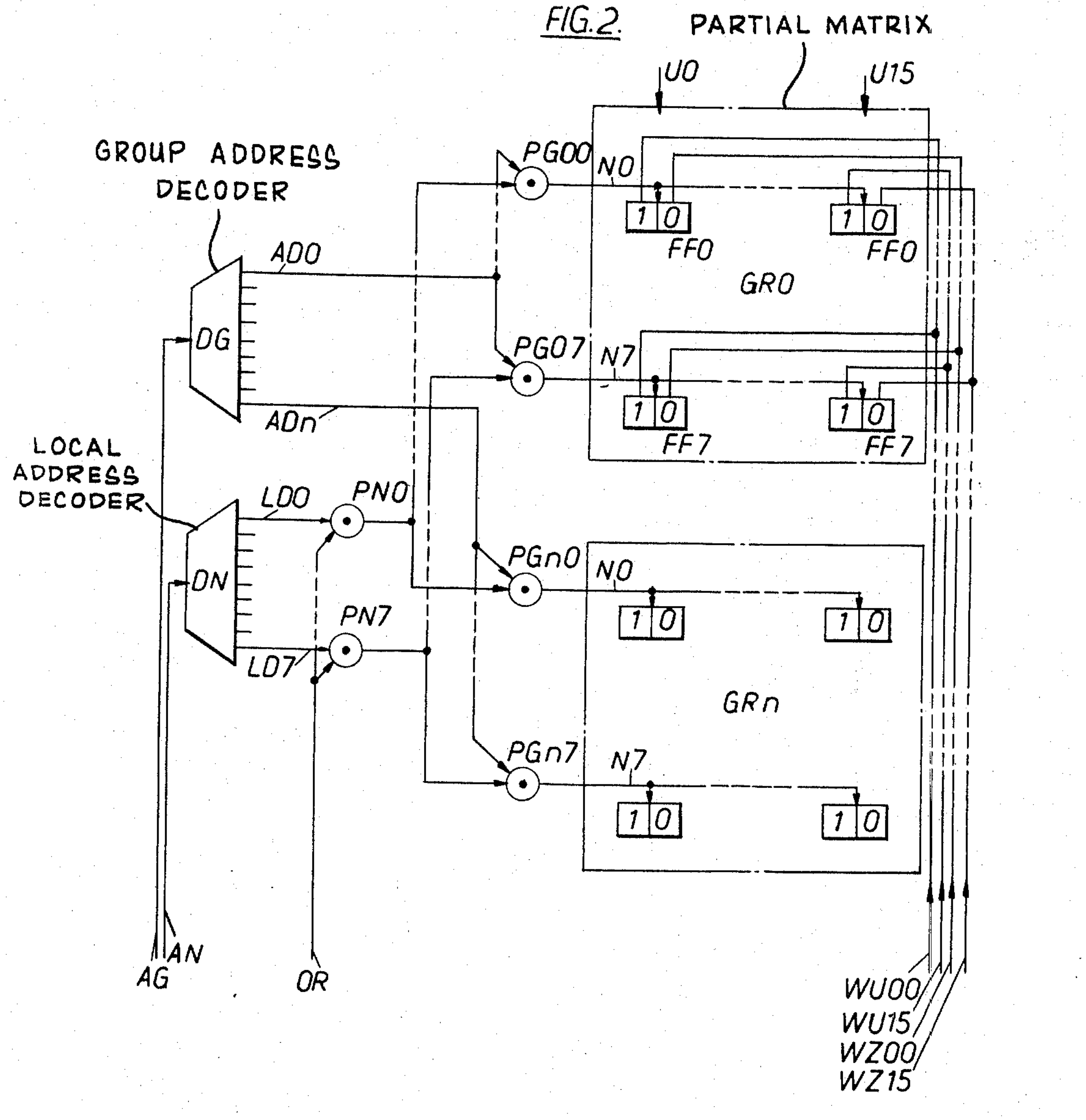
FIG. 2, the diagram of a control matrix designed according to the invention.

Referring to FIG. 2, there will be described a diagram of examplary distributing circuits, designed according to the invention.

The units to be controlled are distributed in several groups of units of the same type. The control bistables of the different units of a group are arranged in the form of a partial matrix such as GRO or GRN. The bistables of a same unit are arranged according to a column in such an order that the homologous bistables of the units of the group are in a same row called level. In this way, the partial matrix GRO includes 16 units U0 to U15. Each unit has 8 control bistables FF0 to FF7. The homologous bistables, such as FF0 and FF7, of units U0 to U15 are respectively arranged on levels N0 and N7.

A bistable, such as FF0, has three inputs located at its upperpart. It is set in position 1, under control of a signal applied on its middle input, when a condition signal is received on its left input. Similarly, it is reset in position 0 when a condition signal is received on its right input. In the absence of condition signals on the right and left inputs, the signal applied on the middle input has no effect and the bistable remains in the position it occupies.

A group address decoder DG supplies from an address receiv-ed on the link AG, a signal on one of conductors AD0 to ADn and thus designates a matrix of a group to be controlled. This signal prepares the operation of gates such as PG00 to PG07 or PGN0 to PGn7.

A level address decoder DN supplies, from a level address received on link AN, a signal on one of conductors LD0 to LD7 and thus designates a level to be controlled. This signal prepares the operation of one of the gates PN0 to PN7.

Under control of a signal OR, supplied to gates PN0 to PN7, the bistables of a level in a partial matrix receive a control signal.

For example, if decoder DG marks wire AD0, the transmitted signal prepares the operation of gates PG00 to PG07. The marking of wire LD0 by decoder DN prepares the operation of gate PN0. Under control of signal OR, gate PN0 is enabled and delivers a signal which enables gate PG00. The latter delivers a signal which is transmitted on level N0 to all bistables FF0 of matrix GRO. Those of these bistables which receive a condition signal either on the left input, supplied by wires WU00/15, or on the right input, supplied by wires WZ00/15, trigger either in position 1 or in position 0. Those which receive no signal remain in the position they have been occupying.

The marking of wires LD0, AD0 and OR thus makes it possible to control bistables FF0 of units U0 to U15 of matrix GR0 and to set them in the positions specified by certain of wires WU00/15 and WZ00/15.

Figure 3:
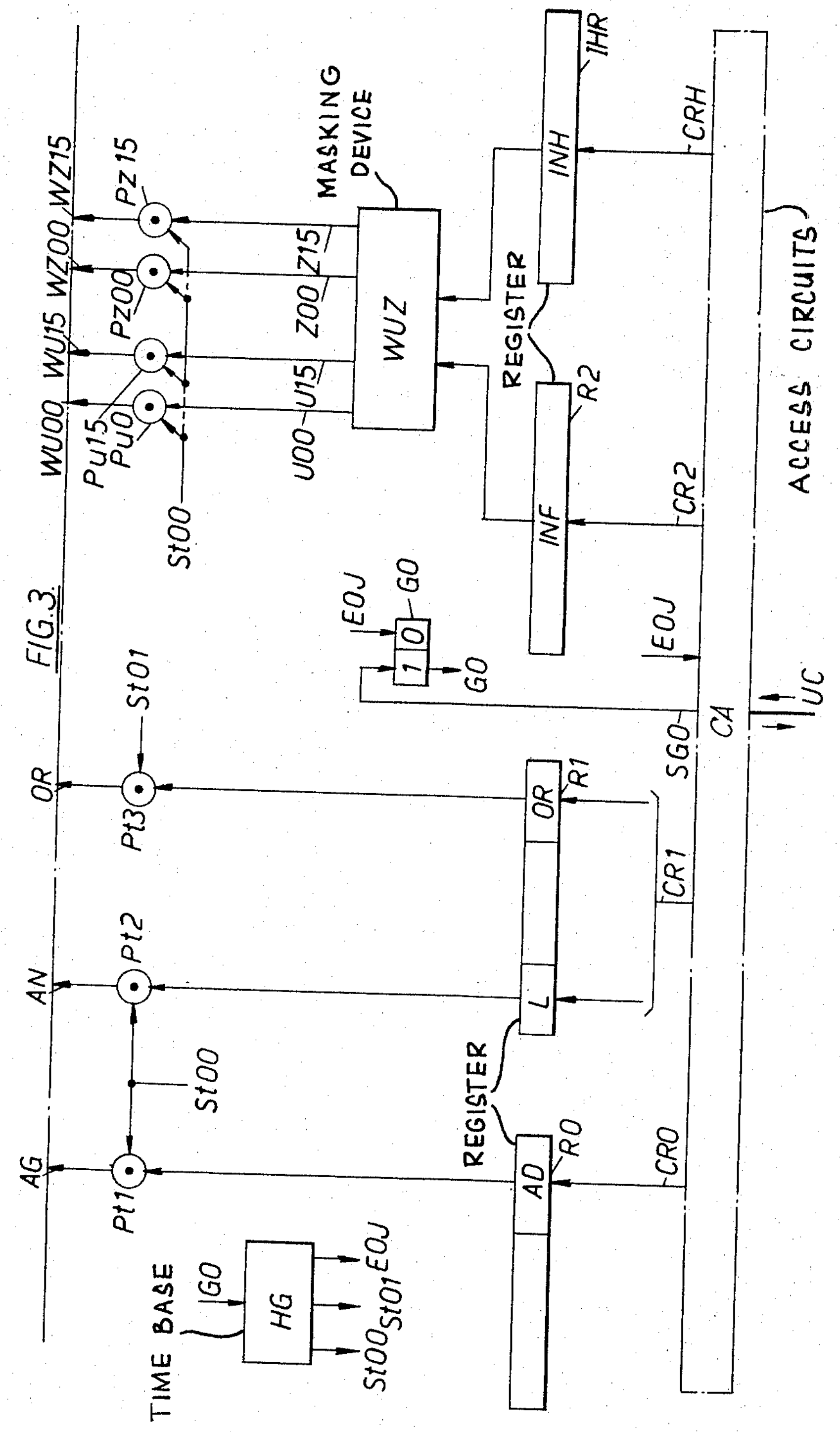
FIG. 3, the diagram of the control circuits of a distributor, designed according to the invention.

Referring to FIG. 3, there will be now described the control circuits controlling the distributing circuits of FIG. 2.

FIG. 3 represents the control circuits of distributor DTJ of FIG. 1. These control circuits are associated with the distributing circuits of FIG. 2. They receive from the central unit UC distributing orders and supply appropriate control signals to the distributing circuits.

The control circuits of FIG. 3 include a register R0 receiving the address of a group of common units (AD), a register R1 receiving from the central unit a distributing order (OR) and a level address (L), a register R2 receiving control data (INF) indicating the position 1 or 0 in which must be set each of the bistables associated with the specified group and level, a register IHR receiving data (INH) enabling inhibiting some bistables, a time base HG, as well as various data processing circuits which will be defined in the course of the distributor operation.

These control circuits communicate with the central unit UC through access circuits CA. A data transfer bus connects the access circuits CA to the central unit UC. The access circuits CA are designed in a well-known way which depends upon the nature of the transfer bus. Their description is beyond the scope of the invention. It will be only noted that they enable the central unit UC to write data into register R0, through line CR0, into register R1, through line CR1, into register R2, through link CR2 and into register IHR, through link CRH. Finally, they enable the central unit UC to call distributor DTJ by setting bistable G0 in position 1 and transmit an end-of-job signal EOJ from the distributor to the central unit UC.

It will be initially assumed that all circuits are at rest, the distributor being unoperated. The registers, in particular, contain no data. Bistable C0 is in position 0.

The central unit UC writes, through acess circuits CA, an address of a group to be controlled AD into register R0, a distributing order OR and a level address L into register R1, control data INF into register R2, data INH into register IHR. It also controls through conductor SG0, the setting in position 1 of bisgable G0.

The data items INF and INH recorded in registers R2 and IHR are transmitted to the masking device WUZ. These data items each consist of 16 bits each of which is assigned to a bistable of the level to be controlled. The bits assigned to a bistable have the same rank in both data items INF and INH. In the data item INF, a bit a value 1 indicates that the corresponding bistable must be set in position 1; a bit of value 0 indicates that the corresponding bistable must be set in position 0. In the data item INH, a bit of value 1 indicates that the corresponding bistables must be set in the position indicated by the same rank bit in the data item INF, a bit of value 0 indicates that the corresponding bistable must not change position. In device WUZ, the data items INF and INH are combined in such way that a bit 1 of data item INH authorizes the retransmission of the same rank bit of the data item INF. This retransmission is carried out on one of wires U00 to U15 towards the bistable to be controlled if the bit of the data item INF is 1, or on one of wires Z00 to Z15 if this bit is 0. A bit 0 of the data item INH inhibits the retransmission of the same rank bit of the data item INF on wires U00 to Z15.

Figure 4:
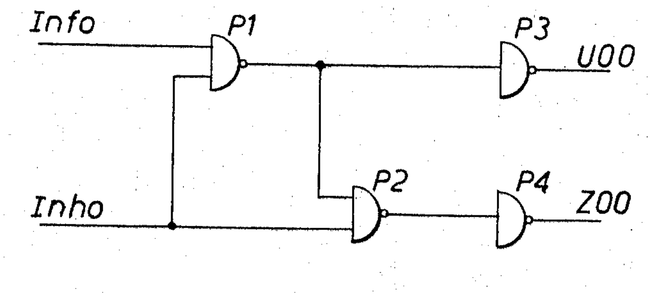
FIG. 4, the circuits of an embodiment of the masking device.

In order to obtain this result, the combination of two same rank bits of data items INF and INH may be simply done in a circuit such as that represented in FIG. 4. This circuit is made up of NAND gates. A gate of this type operates and delivers a signal 0 when all its inputs receive a signal 1. On the contrary, it does not operate and delivers a signal 1 when at least one of its inputs receives a signal 0. On the left of this circuit 8, there has been represented inputs InfO and Inh0 intended to receive the bits of rank 0 of data items INF and INH respectively. It will be considered that a bit 1 in one of registers R2 or IHR of FIG. 3 results in the sending of a signal 1, whereas a bit 0 results in the sending of a signal 0. It can thus be seen, in this circuit, that if the bit of rank 0 of the data item INH has the value 0, the input Inh0 receives a signal 0, which inhibits the operation of gates p1 and p2. Each of them delivers a signal 1. Gates P3 and P4 operate and deliver a signal 0 on the outputs U00 and ZOO.

If the bit of rank 0 of INH has the value 1, a signal 1 is applied to the input Inh0 which enables the gates P1 and P2. Gate P1 operates if the bit of rank 0 of INF has the value 1 (reception of a signal 1 on Inf0). It delivers a signal 0. Gate P3 does not operate and therefore delivers a signal 1 on the output U00. Gate P2 does not operate and therefore delivers a signal 1 which controls the operation of gate P4 which itself delivers a signal 0 on the output Z00. On the contrary, if the bit of rank 0 of INF has the value 0, it can be seen, in the same way, that a signal 1 is supplied on the output Z00 whereas a signal 0 is supplied on the output U00. Briefly, if the bit of INH has the value 0, a signal 0 is transmitted on each wire U00 and Z00, whereas if it has the value 1, a signal 1 is transmitted on the wire U00 or Z00, assuming that the bit of INF has the respective value 1 or 0.

Referring again to FIG. 3, when bistable G0 is set, the signal G0 starts the time base HG. The latter supplies first a signal St00 which enables gates Pt1 and Pt2 for transmitting, towards the distributing circuits of FIG. 2, the address of the group AD to be controlled and the address of a level L in this group. Gate Pt1 transmits the address of the group to be interrogated on line AG towards decoder DG of FIG. 2. Decoder DG delivers a signal on one of its output wires, for example AD0. This signal prepares the operation of gates PG00 to PG07. Gate Pt2 transmits the address of one level on link AN towards decoder DN which supplies in response a signal on one of its output wires, for example LD0. This signal prepares the operation of gate PN0.

Signal St00 also enables operating gates Pu0 to Pu15 and Pz00 to Pz15. The signals delivered by device WUZ are thus retransmitted towards the distributing circuits of FIG. 2. The signals transmitted by conductors Wu00/WU15 are applied to the left inputs of all the bistables and the signals transmitted by conductors WZ00/WZ15 are applied to the right inputs of all the bistables.

At the end of a certain time sufficient for the stabilization of the signals transmitted to the distributing circuits of FIG. 2, the time base HG delivers signal St01. Gate Pt3 operates and retransmits signal OR towards the distributing circuits. This signal OR controls the operation of gate PN0 (FIG. 2). Consequently, gate PG00 is enabled and the bistables FF0 of level NO of group GR0 are set in position 1 or 0, or do not change position according that they receive a signal on their left or right input or no signal at all on these inputs.

Finally, at the end of the time sufficient for the bistables of level NO of group GR0 to trigger, if required, into the convenient positions, the time base HG delivers signal EOJ. This signal is applied to bistable G0 which is reset. The time base HG ceases to operate and returns to its initial state. Signal EOJ is also transmitted to the central unit UC to signal it that the required work has been achieved.

It is obvious that the preceding description has only been given as an unrestrictive example and that numerous alternatives may be considered without departing from the scope of the invention. In particular, the numerical examples have only been given to facilitate the description.

We claim:

1. In a distributor for a switching system, a control circuit and a control matrix, said control circuit comprising a plurality of components controlled from a central unit, first record-ing means coupled to receive and store address data from the central unit, second recording means coupled to receive and store control data from the central unit, third recording means coupled to receive control data from the central unit specifying the states that one or several components of a group must take, fourth recording means provided for receiving inhibition data designating components whose state must remain unchanged, masking means coupled to receive the control and inhibition data from the respective third recording means and the fourth recording means to provide masking signals and control signals, and means coupling said masking signals and said control signals to said control matrix, said control matrix responsive to said masking and control signals to direct signals through a switching system.

2. The invention as claimed in claim 1, in which the first, second, third and fourth recording means include registers and the masking means includes a plurality of logic devices responsive to control and inhibit data to provide said masking signals and control signals.

3. The invention as claimed in claim 1, in which the control matrix includes a plurality of bistable devices, and means are provided to couple the bistable devices to receive said respective masking signals and said control signals for bias of said bistable devices.

* * * * *